US008048308B2

(12) United States Patent
Bernier et al.

(10) Patent No.: US 8,048,308 B2
(45) Date of Patent: Nov. 1, 2011

(54) PROCESS FOR SEPARATING AT LEAST ONE ACTINIDE ELEMENT FROM LANTHANIDE ELEMENTS IN AN AQUEOUS MEDIUM BY SEQUESTRATION AND MEMBRANE FILTRATION

(75) Inventors: Gilles Bernier, Avignon (FR); Jean-Marc Adnet, Pujaut (FR); Alain Favre-Reguillon, Villeurbanne (FR); Gérard Le Buzit, Crosne (FR); Marc Lemaire, Villeurbanne (FR); Stéphane Pellet-Rostaing, Villeurbanne (FR); Antoine Sorin, Villeneuve les Avignon (FR); Jacques Foos, Orsay (FR)

(73) Assignee: Commissariat a l'Energie Atomique, Paris (FR)

( * ) Notice: Subject to any disclaimer, the term of this patent is extended or adjusted under 35 U.S.C. 154(b) by 298 days.

(21) Appl. No.: 12/162,501

(22) PCT Filed: Jan. 30, 2007

(86) PCT No.: PCT/EP2007/050893
§ 371 (c)(1),
(2), (4) Date: Jul. 29, 2008

(87) PCT Pub. No.: WO2007/085659
PCT Pub. Date: Aug. 2, 2007

(65) Prior Publication Data
US 2009/0026138 A1    Jan. 29, 2009

(30) Foreign Application Priority Data
Jan. 30, 2006  (FR) ..................... 06 50325

(51) Int. Cl.
*B01D 15/04* (2006.01)
*B01D 15/00* (2006.01)
*C01F 13/00* (2006.01)
*C01G 56/00* (2006.01)
*C07C 229/00* (2006.01)
*G21F 9/00* (2006.01)

(52) U.S. Cl. ........ 210/638; 210/639; 210/651; 210/652; 562/433; 562/607; 423/2; 423/42; 423/49; 588/1; 588/2; 588/6

(58) Field of Classification Search ................ None
See application file for complete search history.

(56) References Cited

U.S. PATENT DOCUMENTS
3,950,424 A * 4/1976 Pearson et al. .................. 564/7
(Continued)

FOREIGN PATENT DOCUMENTS
FR       2714620       7/1995
(Continued)

OTHER PUBLICATIONS
International Search Report completed May 10, 2007 in International Patent Application No. PCT/EP2007/050893, filed Jan. 30, 2007.
(Continued)

*Primary Examiner* — Krishnan S Menon
*Assistant Examiner* — Dirk Bass
(74) *Attorney, Agent, or Firm* — Brinks Hofer Gilson & Lione (57) ABSTRACT

The invention relates to a process for separating, in an aqueous medium, at least one actinide element from one or more lanthanide elements by using at least one molecule which sequesters the said actinide element to be separated and membrane filtration, the said process successively comprising:
 a) a step of bringing at least one molecule which sequesters the said actinide element in contact with the aqueous medium, the said molecule not being retained in the non-complexed state by the said membrane and being capable of forming a complex with the actinide element to be separated, comprising the said element and at least two of the said sequestering molecules, which complex is capable of being retained by the membrane;
 b) a step of passing the aqueous medium over the membrane in order to form a permeate on one side, comprising an aqueous effluent depleted of the said actinide element, and a retentate comprising the said complex.

22 Claims, 2 Drawing Sheets

U.S. PATENT DOCUMENTS

| | | | |
|---|---|---|---|
| 4,431,546 A * | 2/1984 | Hughes et al. | 210/656 |
| 5,126,272 A * | 6/1992 | Kingston et al. | 436/77 |
| 5,766,478 A | 6/1998 | Smith et al. | |
| 5,868,935 A | 2/1999 | Sirkar et al. | |
| 5,925,254 A | 7/1999 | Lemaire et al. | |
| 6,113,796 A | 9/2000 | Tounissou et al. | |
| 6,843,917 B1 | 1/2005 | Guy et al. | |

FOREIGN PATENT DOCUMENTS

WO     WO 00/73521     12/2000

OTHER PUBLICATIONS

French Search Report dated Sep. 8, 2006, prepared in corresponding French Patent Application No. FR 0650325, filed Jan. 30, 2006.

* cited by examiner

PROCESS FOR SEPARATING AT LEAST ONE ACTINIDE ELEMENT FROM LANTHANIDE ELEMENTS IN AN AQUEOUS MEDIUM BY SEQUESTRATION AND MEMBRANE FILTRATION

This application is a National Stage application of International Application No. PCT/EP2007/050893, filed Jan. 30, 2007, the entire contents of which is hereby incorporated herein by reference. This application also claims the benefit under 35 U.S.C. §119 of French Patent Application No. 0650325, filed Jan. 30, 2006, the entire contents of which is hereby incorporated herein by reference.

TECHNICAL FIELD

The present invention relates to a process for separating at least one actinide element from one or more lanthanide elements contained in aqueous effluents resulting, for example, from the reprocessing of spent nuclear fuel elements.

More precisely it relates to the use of filtration techniques employing porous membranes, combined with sequestration techniques, for separating one or more actinides from lanthanides or for separating lanthanides from one another.

Effluents resulting from the reprocessing of spent nuclear fuel elements generally contain large quantities of actinide elements which generate long-term radioactivity (generally more than three centuries) which is very harmful for the environment, these effluents also comprising lanthanide elements in an oxidation state (III). It is therefore important to carry out separation of the actinide elements and lanthanide elements, in order to be able to isolate aqueous effluents which are very depleted of actinide elements and have a radioactivity which is less harmful for the environment.

The use of techniques for separating actinide elements and lanthanide elements therefore constitutes an essential imperative for preservation of the environment.

Originally, the actinide elements contained in radioactive effluents rich in lanthanide elements were separated by techniques of precipitation or liquid-liquid extraction. However, these techniques present the major drawback of generating waste which then needs to be treated. This significantly complicates the processes and gives them a serious economical handicap.

In order to overcome the drawbacks mentioned above, some authors have considered using membranes in order to separate lanthanide elements in a permeate from actinide elements in a retentate, by initially combining these actinides with sequestering molecules.

For instance, WO 00/73521 describes a process for separating actinide elements from lanthanide elements contained in an aqueous effluent by membrane filtration combined with sequestration, employing:

a step of treating the aqueous effluent, comprising actinides and lanthanides, with a sequestering molecule for example of the following formula:

the sequestering molecule forming a 1/1 complex with the actinides and/or lanthanides;

a step of membrane filtration of the aqueous effluent treated with the sequestering molecule, so as to obtain on the one hand a retentate enriched with americium and a permeate depleted of americium.

When the molecular masses of the sequestering molecules exceed the cut-off threshold of the membrane, a phenomenon of accumulation of the sequestering molecules on the surface of the membrane occurs. This accumulation of sequestering molecules can cause clogging of the membrane, leading to an irreversible loss of the membrane permeability. This concentration phenomenon also has effects on the quality of the retention by the membrane.

In order to resolve this problem of clogging generated in part by sequestering molecules in the free (i.e. not complexed) state, two alternatives have been envisaged:

countercurrent washing of the membrane, with a view to removing the organic and inorganic matter deposited on its surface;

increasing the tangential flow rate of the effluent to be processed at the surface of the membrane, by increasing the rate of supply, modifying the geometry of the flow or by making the membrane surface vibrate.

As regards the first alternative, a certain proportion of the matter deposited on the surface of the membrane and inside the pores sometimes cannot be removed, which limits the service life of these membranes.

As regards the second alternative, all procedures which may be envisaged entail a non-negligible extra cost.

The present invention thus provides a process for separating at least one actinide element from lanthanide elements, making it possible to overcome the drawbacks mentioned above, in particular the drawbacks associated with clogging of the membranes by sequestering molecules which are being used.

SUMMARY OF THE INVENTION

The invention thus relates to a process for separating, in an aqueous medium, at least one actinide element from one or more lanthanide elements by using at least one molecule which sequesters the said actinide element to be separated and membrane filtration, the said process successively comprising:

a) a step of bringing at least one molecule which sequesters the said actinide element in contact with the aqueous medium, the said molecule not being retained in the non-complexed state by the said membrane and being capable of forming a complex with the actinide element to be separated, comprising the said element and at least two of the said sequestering molecules, which complex is capable of being retained by the membrane;

b) a step of passing the aqueous medium over the membrane in order to form a permeate on one side, comprising an aqueous effluent depleted of the said actinide element, and a retentate comprising the said complex.

As mentioned above, the sequestering molecules employed in the process of the invention are selected so that they are not retained by the membrane in the non-complexed state. One of the selection criteria may be the molecular mass of the sequestering molecule in the non-complexed state, which advantageously will be less than the cut-off threshold of the membrane being used. The sequestering molecules are also selected so as to form a complex with the actinide element to be sequestered, comprising the said element and at least two of the said sequestering molecules, which complex is retained by the membrane. This retention of the complex can be explained by the molecular mass of the complex being formed, which may advantageously be greater than the cut-off threshold of the membrane (steric exclusion) and/or by the charge of the complex being formed, the sign of which may advantageously be the same as that of the membrane polarized following passage of the solution comprising the element to be separated, the complex thus being retained on the surface of the membrane by electrostatic interaction (so-called Donnan exclusion).

Contrary to the processes of the prior art, the sequestering molecules are not retained by the membrane when they are in the non-complexed state, so that they do not accumulate on its surface and do not clog it.

The immediate benefit of the invention therefore resides in the selection of sequestering molecules which can cross through the membrane in the non-complexed state and which form, with one another and the element to be separated, a complex which is retained by the membrane.

Advantageously, sequestering molecules which may be used in order to separate an actinide element, such as americium, from lanthanide elements is a monoaromatic compound carrying at least two sequestering functions on its ring, which are selected from —COOH, —CONHOH, —SO$_3$H, —PO$_3$H$_2$, —P(O)OHQ with Q representing an alkyl, hydroxyalkyl or oxoalkyl group. Although the flat arrangement of the atoms of the sequestering functions in molecules of this type is generally considered to be unfavourable for any sequestration reaction, the Inventors have surprisingly been able to show that such sequestering molecules are effective for the separation of at least one actinide element from lanthanide elements.

For example, the monoaromatic compound may comprise one or more oxygen, sulphur and/or nitrogen atoms in its ring, in particular one or more nitrogen atoms.

The monoaromatic compounds which can be used may comprise 6 members. As examples of such compounds, the one which corresponds to the following general formula may be mentioned:

in which:
  A, B, D independently represent a carbon atom or a nitrogen atom;
  X$_1$ and X$_2$ independently represent a —COOH, —CONHOH, —SO$_3$H, —PO$_3$H$_2$ or —P(O)OHQ group, with Q representing an alkyl, hydroxyalkyl or oxoalkyl group;
  Z$_1$, Z$_2$ and Z$_3$ are selected independently from the group consisting of —H, —F, —Cl, —Br, —I, —OH, —OR, —SR, —NHR, —CHO, —COOR, —CONR$_1$R$_2$, —NR$_1$R$_2$, —NR$_1$—NR$_2$R$_3$, —R'—SO$_2$R, —SO$_3$R, when A, B and/or D represents a carbon atom, with:
  R, R$_1$, R$_2$, R$_3$ independently representing H, an alkyl or hydroxyalkyl group comprising from 1 to 6 carbon atoms;
  R' representing an alkene or hydroxyalkene group comprising from 1 to 6 carbon atoms.
Specific examples falling within the definition of the general formula above correspond to the following formulae:

with X$_1$, X$_2$, Z$_1$, Z$_2$ and Z$_3$ being as defined above.

A particular compound is that corresponding to the following formula:

This compound is particularly effective for separating americium from lanthanide elements such as europium. It forms in particular a complex comprising three sequestering molecules with americium.

The monoaromatic compounds which can be used may also comprise 5 members, such as those corresponding to the following formula:

in which:
  A represents a sulphur or oxygen atom;
  X$_1$ and X$_2$ are selected independently from the group consisting of —COOH, —CONHOH, —SO$_3$H, —PO$_3$H$_2$, —P(O)OHQ with Q representing an alkyl, hydroxyalkyl or oxoalkyl group;
  Z$_1$ and Z$_2$ are selected independently from the group consisting of —H, —F, —Cl, —Br, —I, —OH, —OR, —SR, —NHR, —CHO, —COOR, —CONR$_1$R$_2$, —NR$_1$R$_2$, —NR$_1$—NR$_2$R$_3$, —R'—SO$_2$R, —SO$_3$R with:
  R, R$_1$, R$_2$, R$_3$ independently representing H, an alkyl or hydroxyalkyl group comprising from 1 to 6 carbon atoms;
  R' representing an alkene or hydroxyalkene group comprising from 1 to 6 carbon atoms.

The sequestering molecules as defined above have, in particular, an excellent selectivity for americium with respect to the lanthanide elements such as europium.

The number of moles of sequestering molecule is such that it is greater than or equal to the equivalent quantity of moles of actinide to be separated.

As mentioned above, the process according to the invention is based on the combination of a process for selective sequestration of actinide elements with respect to lanthanide elements and a process of membrane separation, and more particularly ultrafiltration and nanofiltration, for step b).

The process of the invention is not however limited only to ultrafiltration and nanofiltration; rather, it covers any other membrane technique of separation which employs a semipermeable membrane forming a barrier between two homogeneous media, presenting an unequal resistance to the passage of different constituents of a fluid (suspension, solute, solvent). The force making it possible for some of the said constituents to cross the barrier may result from a pressure gradient (microfiltration, ultrafiltration, nanofiltration, reverse osmosis), a concentration gradient (dialysis) or an electrical potential gradient (electrodialysis).

The filtration membranes, in particular nanofiltration or ultrafiltration membranes, which can be used in the scope of the process of the invention may be organic, inorganic or organomineral. They must be permeable to the sequestering molecules in the free (i.e. not complexed) state of the invention and retain them when they are complexed with the actinide element or elements to be separated.

According to the invention and in particular with the sequestering molecules as defined above, membranes which are used advantageously have a cut-off threshold ranging from 250 to 10,000 Daltons, and more particularly from 1000 to 5000 Daltons.

Specifically, the cut-off threshold of a membrane may be defined as the molar mass of a solid (generally a polyethylene glycol) the retention of which is 90%, the units of this cut-off threshold generally being expressed in daltons.

The membranes may be produced using at least one material selected from the group consisting of aromatic polyamides, sulphonated polysulphones, polybenzimidazolones, optionally grafted vinylidene polyfluorides, polyamides, cellulose esters, cellulose ethers or perfluorinated ionomers, combinations of these polymers and the copolymers obtained from monomers of at least two of these polymers.

From the point of view of configuration, the membranes of the invention are advantageously spiralled or plane membranes.

As examples of membranes for carrying out the process of the invention, the membranes marketed by Osmonics under the name Desal GH may be mentioned in particular. This type of membrane has in particular:

a cut-off threshold of a 2500 Daltons;
a surface area of 0.25 m$^2$;
a maximum permeate volume flow rate of 3 l·h$^{-1}$·m$^{-2}$; and
good resistance to irradiation of the membrane (a cumulative dosage of 1 MGy did not cause visible deterioration of the polymers constituting the surface of the membrane).

Modules in the form of tubes or parallel plates may be used, such as those conventionally used in this technique. Modules may also be used in which the membranes are plane membranes wound in a spiral around a hollow perforated tube intended to collect the permeate.

The processing conditions such as the pH of the aqueous solution to be processed, the pressure difference, the flow rate of the aqueous effluent and the temperature used, may be controlled in order to obtain the desired separation coefficients.

Step a) is advantageously carried out with a predetermined pH, preferably in the range of from 1 to 6; this pH may be adjusted by adding a base or an acid, preferably NaOH or HNO$_3$.

The filtration step is generally carried out by applying a pressure difference between the two opposite faces of the membrane, so as to collect a permeate depleted of actinide element(s) to be separated and a retentate enriched with actinide element(s) to be separated. The pressure difference between the two opposite faces of the membrane may vary in a wide interval, but good results can be obtained by applying a pressure difference ranging from 1 to 10 bar.

According to another aspect of the invention, the invention relates to the use of a monoaromatic compound carrying at least two sequestering functions on its ring, which are selected from —COOH, —CONHOH, —SO$_3$H, —PO$_3$H$_2$, —P(O)OHQ with Q representing an alkyl, hydroxyalkyl or oxoalkyl group, for separating at least one actinide element such as americium from one or more lanthanide elements, for example europium, preferably by membrane filtration.

For example, the monoaromatic compound may comprise one or more oxygen, sulphur and/or nitrogen atoms in its ring, in particular one or more nitrogen atoms.

The monoaromatic compounds which can be used may comprise 6 members. As examples of such compounds, the one which corresponds to the following general formula may be mentioned:

in which:

A, B, D independently represent a carbon atom or a nitrogen atom;

X$_1$ and X$_2$ independently represent a —COOH, —CONHOH, —SO$_3$H, —PC$_3$H$_2$ or —P(O)OHQ group, with Q representing an alkyl, hydroxyalkyl or oxoalkyl group;

Z$_1$ Z$_2$ and Z$_3$ are selected independently from the group consisting of —H, —F, —Cl, —Br, —I, —OH, —OR, —SR, —NHR, —CHO, —COOR, —CONR$_1$R$_2$, —NR$_1$R$_2$, —NR$_1$—NR$_2$R$_3$, —R'—SO$_2$R, —SO$_3$R, when A, B and/or D represents a carbon atom, with:

R, R$_1$, R$_2$, R$_3$ independently representing H, an alkyl or hydroxyalkyl group comprising from 1 to 6 carbon atoms;

R' representing an alkene or hydroxyalkene group comprising from 1 to 6 carbon atoms.

Specific examples falling within the definition of the general formula above correspond to the following formulae:

with X$_1$, X$_2$, Z$_1$, Z$_2$ and Z$_3$ being as defined above.

A particular compound is that corresponding to the following formula:

The monoaromatic compounds which can be used may also comprise 5 members, such as those corresponding to the following formula:

in which:
  A represents a sulphur or oxygen atom;
  $X_1$ and $X_2$ are selected independently from the group consisting of —COOH, —CONHOH, —$SO_3H$, —$PO_3H_2$, —P(O)OHQ with Q representing an alkyl, hydroxyalkyl or oxoalkyl group;
  $Z_1$ and $Z_2$ are selected independently from the group consisting of —H, —F, —Cl, —Br, —I, —OH, —OR, —SR, —NHR, —CHO, —COOR, —$CONR_1R_2$, —$NR_1R_2$, —$NR_1$—$NR_2R_3$, —R'—$SO_2R$, —$SO_3R$
    with:
  R, $R_1$, $R_2$, $R_3$ independently representing H, an alkyl or hydroxyalkyl group comprising from 1 to 6 carbon atoms;
  R' representing an alkene or hydroxyalkene group comprising from 1 to 6 carbon atoms.

The sequestering molecules as defined above have, in particular, an excellent selectivity for americium with respect to the lanthanide elements.

The invention will now be described with reference to the following examples, which are given by way of illustration and without implying limitation.

DETAILED DESCRIPTION OF PARTICULAR EMBODIMENTS

Figure 1:
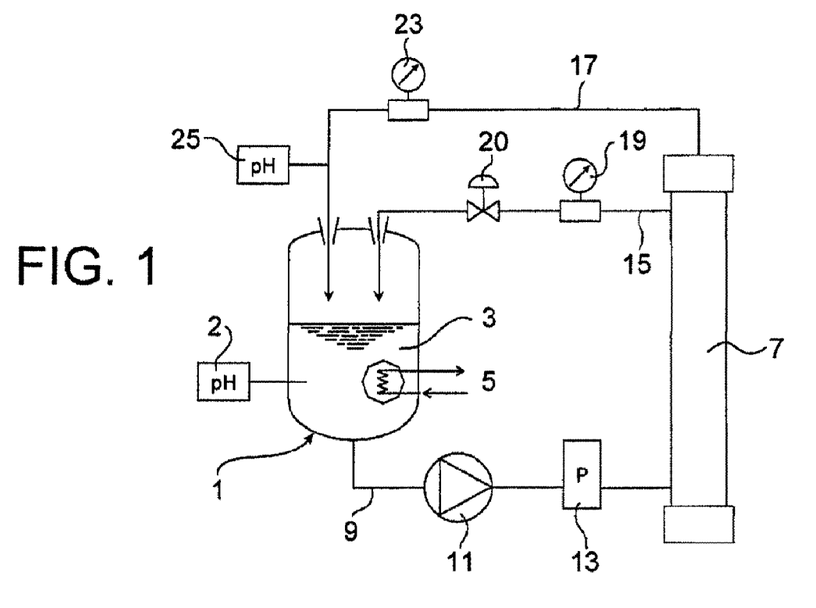
FIG. 1 is a schematic representation of the installation for carrying out the process of the invention.

The following examples are carried out in a tangential filtration installation represented in FIG. 1. This installation comprises a double-walled glass reservoir 1 with a capacity of 1 liter containing the effluent 3 to be treated, and a pH meter 2 intended to measure the pH of the solution. This reservoir is kept at a suitable temperature by a cooling loop 5. The effluent to be processed is conveyed from the reservoir 1 to the filtration module 7 through a pipeline 9 equipped with a gear pump 11 making it possible to vary the flow rate up to $900\ l\cdot h^{-1}$, and a differential pressostat 13 for protecting against any possible abnormally high pressures and for limiting the operating pressure to a maximum of 4.5 bar. On the one hand the retentate R is drawn off from this filtration module 7 through the pipeline 15, and on the other hand the permeate P is drawn off through the pipeline 17. The pipelines 15 and 17 make it possible to convey R and P into the reservoir 1. The pipeline 15 is equipped with a manometer 19 and a needle valve 20, and the pipeline 17 is equipped with a flow meter 23 for measuring the flow rate of permeate, and with a pH meter 25 (combined Ag/AgCl pH electrode for measuring the pH of the permeate).

The manometer is an all stainless steel manometer with a glycerine bath graduated from 0 to 10 bar, placed upstream of the needle valve in order to carry out the pressure measurements.

The filtration module comprises a membrane holder (model reference: Vessel PV1812, manufactured by SEPRA) made of stainless steel capable of withstanding a pressure of 69 bar and a temperature of 50° C., and a membrane contained in the membrane holder, this spiralled membrane (Desal GH, Osmotics) being of length 305.0 mm, of diameter 47.0 mm and of shim thickness 0.71 mm.

The membrane furthermore has the following characteristics:
  a cut-off threshold of a 2500 Daltons;
  a surface area of $0.25\ m^2$;
  a maximum permeate volume flow rate of $3\ l\cdot h^{-1}\cdot m^{-2}$; and
  good resistance to irradiation of the membrane (a cumulative dosage of 1 MGy did not cause visible deterioration of the polymers constituting the surface of the membrane).

EXAMPLE 1

A precisely weighed quantity close to 5.54 mol of 2,6-pyridine dicarboxylic acid (PDCA) is dissolved in 0.8 liters of $0.1\ mol\cdot l^{-1}$ strength sodium hydroxide. The pH of the solution is set to 1.5 by adding concentrated nitric acid ([$HNO_3$]=5.0 $mol\cdot l^{-1}$). A batch composed of a solution comprising lanthanide elements in oxidation state (III), a europium tracer $^{152}Eu(III)$, an americium tracer $^{241}Am(III)$ is added to the initial solution.

The batch more precisely comprises the composition shown in Table 1.

| Elements | Concentration in $mmol\cdot l^{-1}$ | Concentration in $mg\cdot l^{-1}$ | Radioactivity in $MBq\cdot l^{-1}$ |
|---|---|---|---|
| $^{241}Am(III)$ | $6.64\cdot 10^{-4}$ | $160\cdot 10^{-3}$ | 20 |
| $^{152}Eu(III)$ | $1.15\cdot 10^{-5}$ | $1.75\cdot 10^{-3}$ | 1 |
| La(III) | $2.92\cdot 10^{-1}$ | 40.56 | — |
| Ce(III) | $5.65\cdot 10^{-1}$ | 79.17 | — |
| Pr(III) | $2.63\cdot 10^{-1}$ | 37.06 | — |
| Nd(III) | $9.43\cdot 10^{-1}$ | 136.02 | — |
| Sm(III) | $1.76\cdot 10^{-1}$ | 26.46 | — |
| Eu(III) | $3.42\cdot 10^{-2}$ | 5.2 | — |
| Gd(III) | $3.18\cdot 10^{-2}$ | 5.0 | — |
| Total of the lanthanides(III) | 2.31 | — | — |

The pH is readjusted to 1.3 by adding concentrated sodium hydroxide ([NaOH]=5.0 mol·l$^{-1}$). The solution is finally introduced into the reactor. The tangential flow rate is set to 6.5 l·min$^{-1}$, the transmembrane pressure to 1.0 bar and the temperature to 20° C. The pH is increased progressively with additions of concentrated sodium hydroxide in stages with a duration of 45 minutes (estimated time to reach equilibrium of the membrane when all the operating parameters constant). Sampling of the permeate and retentate as well as measurement of the permeate volume flow rate are carried out for each pH stage.

The samples are analysed by ICP-AES (standing for "Inductively Coupled Plasma-Atomic Emission Spectroscopy") in order to measure the concentration of lanthanide (III) metals and by gamma spectrometry in order to measure the concentration of americium(III) and europium(III) tracer.

Figure 2:
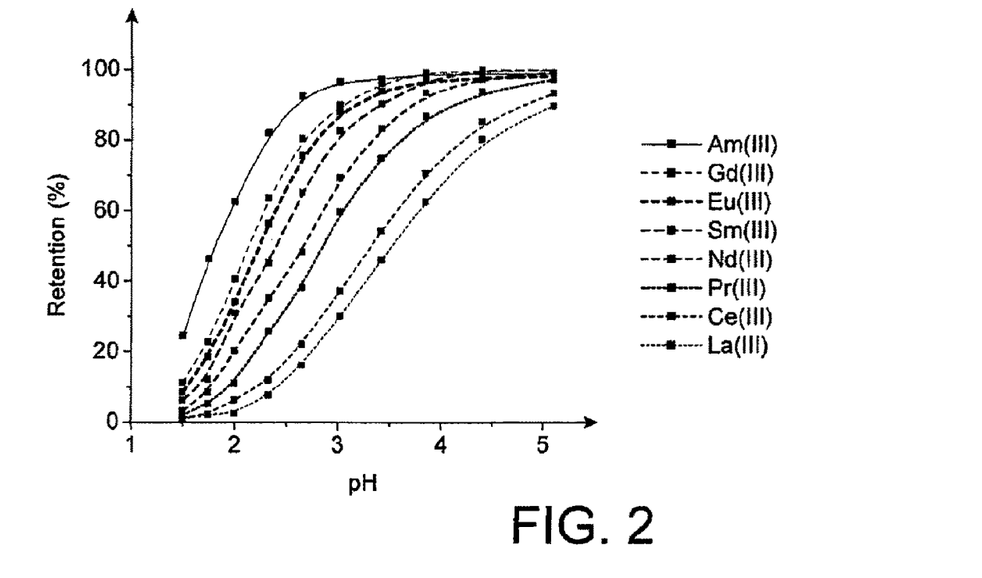
FIGS. 2 and 3 are diagrams respectively representing the retention coefficient of americium(III) and lanthanide(III) elements as a function of the pH, and the separation factor of americium(III) with respect to lanthanide(III) elements under the experimental conditions of Example 1.

FIG. 2 illustrates the retention coefficient of the various lanthanide(III) metals and americium(III) as a function of the pH for a ratio [PDCA]/3*([Ln(III)]+[Am(III)]) equal to 1.

The retention coefficients of the lanthanide(III) metals at pH=1.5 lie between 3 and 9%, whereas that of americium(III) reaches 25%. With an increasing pH, the retention coefficients of americium(III) and the lanthanide(III) metals increase independently until reaching a maximum of 99% at pH 2.0 and reaches the value of 24% separation, whereas the greatest difference in retention between americium(III) and lanthanum(III) reaches 74% at pH=2.3.

Figure 3:
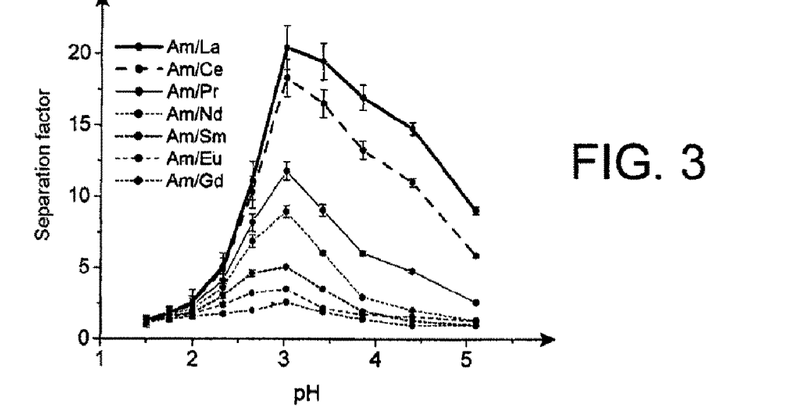

FIG. 3 illustrates the variations in the Am(III)/Ln(III) separation factors as a function of the pH, Ln corresponding to the abbreviation for lanthanide.

For all the lanthanide(III) metals, the Am(III)/Ln(III) separation factor reaches a maximum in the vicinity of pH=3.0. This maximum is commensurately higher when the stability constant of the complexes is low. Thus, the greatest selectivity corresponds to the pairing Am(III)/La(III) for which the separation factor reaches 20.5, which shows that the process of the invention is particularly suitable for the separation of americium(III) with respect to lanthanum(III). Conversely, the Am(III)/Gd(III) separation is more constraining with a separation factor of 3.5.

The retention coefficient is the fraction of a given species which is retained by the membrane, relative to the concentration of this species in the feed solution. It is defined by:

$$R = \left(1 - \frac{C_P}{C_R}\right) \times 100$$

where $C_P$ and $C_R$ are the concentrations of the species in the permeate and in the retentate, respectively.

The transmission coefficient is defined as the complement of the retention coefficient: T=100−R The separation factor of a species A relative to a species B (SF$_{A/B}$) is defined by the ratio of the transmission coefficients of these two species:

$$SF_{A/B} = \frac{[TR_{An}]}{[TR_{Ln}]} = \frac{[An]_P}{[An]_R} \cdot \frac{[Ln]_R}{[An]_P}$$

where $[An]_P$ and $[An]_R$ are respectively the actinide concentrations in the permeate and the retentate, and $[Ln]_P$ are $[Ln]_R$ are respectively the lanthanide concentrations in the permeate and the retentate.

The separation factor SF An/Ln will be high if both the retention coefficient of the actinide is very high (for example >95%) and if that of the lanthanides is as low as possible.

EXAMPLE 2

A quantity close to 1.85 moles of europium(III) nitrates, 9.2.10$^{-6}$ moles of europium tracer $^{152}$Eu(III) and 5.31.10$^{-4}$ moles of americium $^{241}$Am(III) are dissolved in 0.8 liters of distilled water. The pH of the solution is set to 2.0 by adding concentrated nitric acid ([HNO$_3$]=5.0 mol·l$^{-1}$). The solution is subsequently introduced into the reactor. The tangential flow rate is set to 6.5 l·min$^{-1}$, the transmembrane pressure to 1.0 bar and the temperature to 20° C. The sequestering molecule concentration is increased progressively with additions of a concentrated mother solution of sequestering molecule ([PDCA]=1.0 mol·l$^1$) in stages of 45 minutes. Sampling of the permeate and retentate as well as measurement of the permeate volume flow rate are carried out for each concentration stage.

Figure 4:
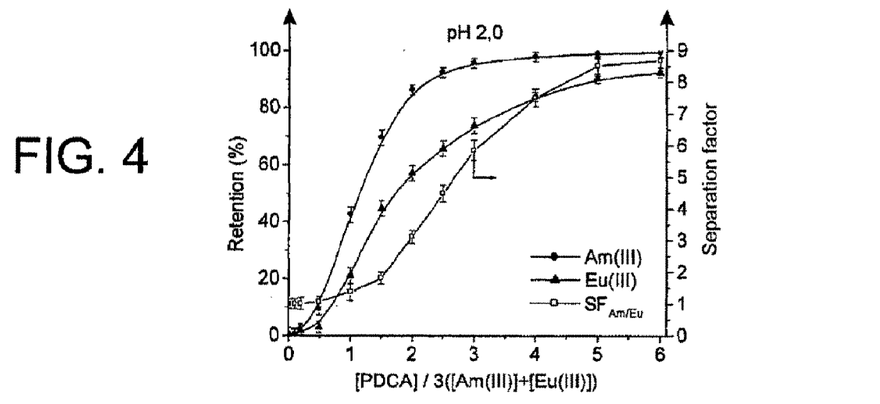
FIG. 4 is a diagram representing the variations in the retention coefficients of americium(III) and europium(III) and the Am(III)/Eu(III) separation factors (Sf Am/Eu) at pH 2.0 as a function of the ratio [PDCA]/3*{[Am(III)]+[Eu(III)]} under the experimental conditions of Example 2.

FIG. 4 presents the variations in the retention coefficients of americium Am(III) and europium Eu(III) as well as the Am(III)/Eu(III) separation factor (Sf Am/Eu) at pH 2.0 as a function of the ratio [PDCA]/3([Eu(III)]+[Am(III)]) from 0 to 6. With this acidity, the separation factor Sf Am(III)/Eu(III) reaches a maximum of 8.7 for a ratio [PDCA]/3([Eu(III)]+[Am(III)]) of 6.0.

EXAMPLE 3

The experimental protocol is similar to Example 2, except that the pH is set to 3.0.

Figure 5:
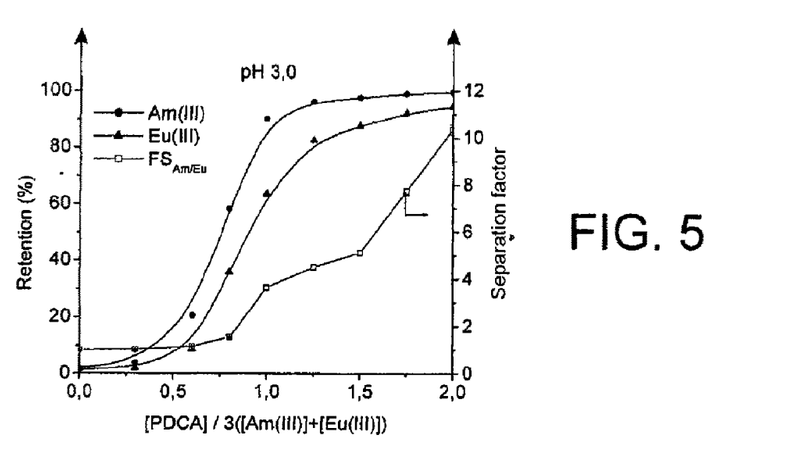
FIG. 5 is a diagram representing the variations in the retention coefficients of americium Am(III) and europium Eu(III) and the Am(III)/Eu(III) separation factors (Sf Am/Eu) at pH 3.0 as a function of the ratio [PDCA]/3*{[Am(III)]+[Eu (III)]} under the experimental conditions of Example 3.

FIG. 5 illustrates the variations in the retention coefficients of the traces of americium Am(III) and of a macroconcentration of europium Eu(III), as well as their separation factor as a function of the ratio [PDCA]/3([Eu(III)]+[Am(III)]) at pH 3.0.

At pH 3.0, the retention coefficients of Am(III) and europium Eu(III) increase separately as a function of the number of PDCA equivalents until reaching a maximum of more than 99 and 95% respectively. The separation factor reaches a maximum of 10.2 for a ratio [PDCA]/3([Eu(III)]+[Am(III)]) of 2.0.

The invention claimed is:

1. Process for separating, in an aqueous medium, at least one actinide element from one or more lanthanide elements by using, in combination, at least one molecule which sequesters the at least one actinide element to be separated and membrane filtration, the process successively comprising:
   a) bringing the at least one molecule which sequesters the at least one actinide element in contact with the aqueous medium, the at least one molecule not being retained in a non-complexed state by the membrane and being capable of forming a complex with the at least one actinide element to be separated, the complex comprising the at least one actinide element and at least two of the at least one sequestering molecules, which complex is capable of being retained by the membrane; and
   b) passing the aqueous medium over the membrane in order to form a permeate on one side, the permeate comprising an aqueous effluent depleted of the at least one actinide element, and a retentate comprising the complex,
   wherein the at least one sequestering molecule is a monoaromatic compound carrying at least two sequestering functions on its ring, which are selected from —COOH, —CONHOH, —SO₃H, —PO₃H₂, —P(O)OHQ with Q representing an alkyl, hydroxyalkyl or oxoalkyl group, and
wherein the monoaromatic compound corresponds to the following formula:

wherein:
A, B, D independently represent a carbon atom or a nitrogen atom;
X₁ and X₂ independently represent a —COOH, —CONHOH, —SO₃H, —PO₃H₂ or —P(O)OHQ group, with Q representing an alkyl, hydroxyalkyl or oxoalkyl group; and
Z₁, Z₂ and Z₃ are selected independently from the group consisting of —H, —F, —Cl, —Br, —I, —OH, —OR, —SR, —NHR, —CHO, —COOR, —CONR₁R₂, —NR₁R₂, —NR₁—NR₂R₃, —R'—SO₂R, —SO₃R, when A, B and/or D represents a carbon atom, with:
R, R₁, R₂, R₃ independently representing H, an alkyl or hydroxyalkyl group comprising from 1 to 6 carbon atoms; and
R' representing an alkene or hydroxyalkene group comprising from 1 to 6 carbon atoms.

2. Process according to claim 1, wherein the at least one actinide element to be separated is americium.

3. Process according to claim 1, wherein step b) is carried out by ultrafiltration or nanofiltration.

4. Process according to claim 1, wherein the contacting step a) is carried out with a predetermined pH.

5. The process of claim 1,
wherein the monoaromatic compound corresponds to the following formula:

6. Process according to claim 5, wherein the at least one actinide element to be separated is americium.

7. Process according to claim 5, wherein step b) is carried out by ultrafiltration or nanofiltration.

8. Process according to claim 5, wherein the contacting step a) is carried out with a predetermined pH.

9. Process for separating, in an aqueous medium, at least one actinide element from one or more lanthanide elements by using, in combination, at least one molecule which sequesters the at least one actinide element to be separated and membrane filtration, the process successively comprising:
a) bringing the at least one molecule which sequesters the at least one actinide element in contact with the aqueous medium, the at least one molecule not being retained in a non-complexed state by the membrane and being capable of forming a complex with the at least one actinide element to be separated, the complex comprising the at least one actinide element and at least two of the at least one sequestering molecules, which complex is capable of being retained by the membrane; and
b) passing the aqueous medium over the membrane in order to form a permeate on one side, the permeate comprising an aqueous effluent depleted of the at least one actinide element, and a retentate comprising the complex,
wherein the at least one sequestering molecule is a monoaromatic compound carrying at least two sequestering functions on its ring, which are selected from —COOH, —CONHOH, —SO₃H, —PO₃H₂, —P(O)OHQ with Q representing an alkyl, hydroxyalkyl or oxoalkyl group, and
wherein the monoaromatic compound corresponds to one of the following formulae:

wherein:
X₁ and X₂ independently represent a —COOH, —CONHOH, —SO₃H, —PO₃H₂ or —P(O)OHQ group, with Q representing an alkyl, hydroxyalkyl or oxoalkyl group; and
Z₁, Z₂ and Z₃ are selected independently from the group consisting of —H, —F, —Cl, —Br, —I, —OH, —OR, —SR, —NHR, —CHO, —COOR, —CONR₁R₂, —NR₁R₂, —NR₁—NR₂R₃, —R'—SO₂R, —SO₃R, with:
R, R₁, R₂, R₃ independently representing H, an alkyl or hydroxyalkyl group comprising from 1 to 6 carbon atoms; and
R' representing an alkene or hydroxyalkene group comprising from 1 to 6 carbon atoms.

10. Process according to claim 9, wherein the at least one actinide element to be separated is americium.

11. Process according to claim 9, wherein step b) is carried out by ultrafiltration or nanofiltration.

12. Process according to claim 9, wherein the contacting step a) is carried out with a predetermined pH.

13. Process for separating, in an aqueous medium, at least one actinide element from one or more lanthanide elements by using, in combination, at least one molecule which sequesters the at least one actinide element to be separated and membrane filtration, the process successively comprising:
a) bringing the at least one molecule which sequesters the at least one actinide element in contact with the aqueous medium, the at least one molecule not being retained in a non-complexed state by the membrane and being capable of forming a complex with the at least one actinide element to be separated, the complex comprising the at least one actinide element and at least two of the at least one sequestering molecules, which complex is capable of being retained by the membrane; and
b) passing the aqueous medium over the membrane in order to form a permeate on one side, the permeate comprising an aqueous effluent depleted of the at least one actinide element, and a retentate comprising the complex, wherein the at least one sequestering molecule is a monoaromatic compound carrying at least two sequestering functions on its ring, which are selected from —COOH, —CONHOH, —SO$_3$H, —PO$_3$H$_2$, —P(O)OHQ with Q representing an alkyl, hydroxyalkyl or oxoalkyl group, and wherein the monoaromatic compound is a 5-membered ring.

14. Process according to claim 13, wherein the monoaromatic compound comprises one or more oxygen, sulphur and/or nitrogen atoms in its ring.

15. Process according to claim 13, wherein the monoaromatic compound comprises one or more nitrogen atoms in its ring.

16. Process according to claim 13, wherein the at least one actinide element to be separated is americium.

17. Process according to claim 13, wherein step b) is carried out by ultrafiltration or nanofiltration.

18. Process according to claim 13, wherein the contacting step a) is carried out with a predetermined pH.

19. Process for separating, in an aqueous medium, at least one actinide element from one or more lanthanide elements by using, in combination, at least one molecule which sequesters the at least one actinide element to be separated and membrane filtration, the process successively comprising:
   a) bringing the at least one molecule which sequesters the at least one actinide element in contact with the aqueous medium, the at least one molecule not being retained in a non-complexed state by the membrane and being capable of forming a complex with the at least one actinide element to be separated, the complex comprising the at least one actinide element and at least two of the at least one sequestering molecules, which complex is capable of being retained by the membrane; and
   b) passing the aqueous medium over the membrane in order to form a permeate on one side, the permeate comprising an aqueous effluent depleted of the at least one actinide element, and a retentate comprising the complex, wherein the at least one sequestering molecule is a monoaromatic compound carrying at least two sequestering functions on its ring, which are selected from —COOH, —CONHOH, —SO$_3$H, —PO$_3$H$_2$, —P(O)OHQ with Q representing an alkyl, hydroxyalkyl or oxoalkyl group, and wherein the monoaromatic compound corresponds to the following formula:

wherein:

A represents a sulphur or oxygen atom;

$X_1$ and $X_2$ are selected independently from the group consisting of —COOH, —CONHOH, —SO$_3$H, —PO$_3$H$_2$, —P(O)OHQ with Q representing an alkyl, hydroxyalkyl or oxoalkyl group; and $Z_1$ and $Z_2$ are selected independently from the group consisting of —H, —F, —Cl, —Br, —I, —OH, —OR, —SR, —NHR, —CHO, —COOR, —CONR$_1$R$_2$, —NR$_1$R$_2$, —NR$_1$—NR$_2$R$_3$, —R'—SO$_2$R, —SO$_3$R with:

R, $R_1$, $R_2$, $R_3$ independently representing H, an alkyl or hydroxyalkyl group comprising from 1 to 6 carbon atoms; and R' representing an alkene or hydroxyalkene group comprising from 1 to 6 carbon atoms.

20. Process according to claim 19, wherein the at least one actinide element to be separated is americium.

21. Process according to claim 19, wherein step b) is carried out by ultrafiltration or nanofiltration.

22. Process according to claim 19, wherein the contacting step a) is carried out with a predetermined pH.

* * * * *